June 3, 1924.
C. L. MICHOD
FENCE STRUCTURE
Filed Nov. 3, 1919
1,496,482
2 Sheets-Sheet 1
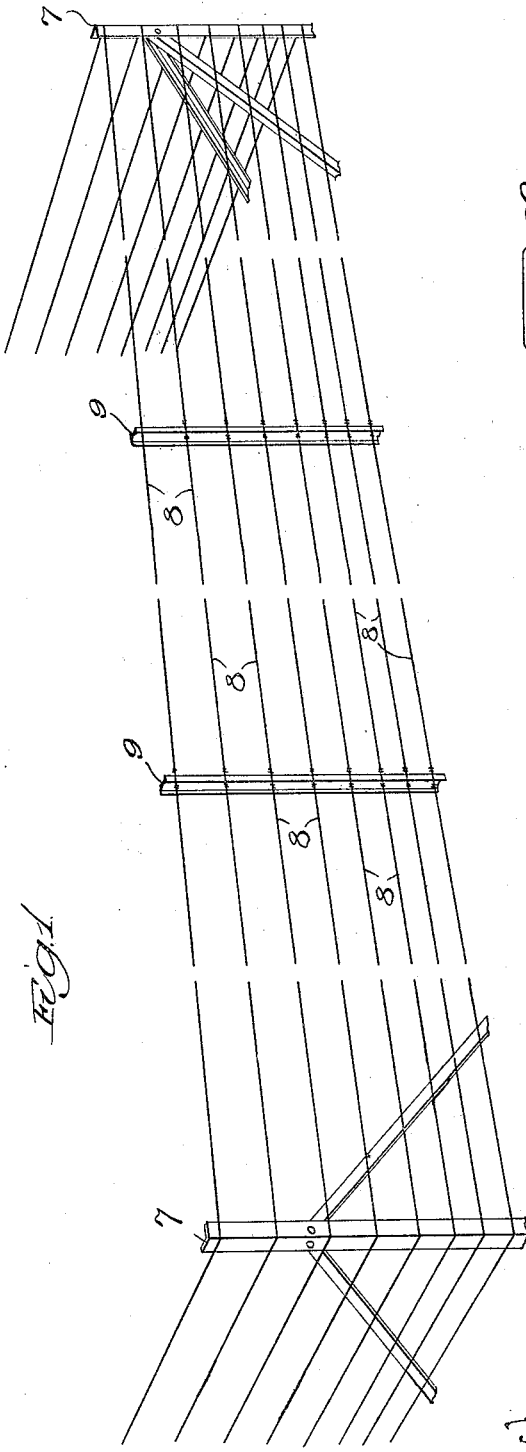
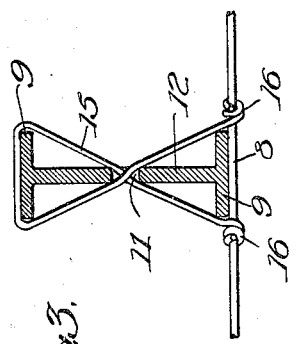
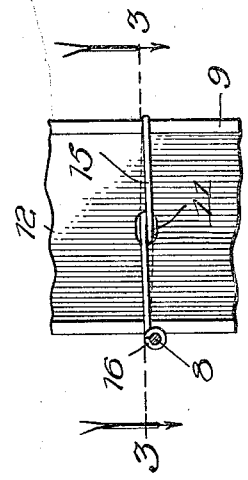
Inventor:
Charles L. Michod June 3, 1924.
C. L. MICHOD
FENCE STRUCTURE
Filed Nov. 3, 1919
1,496,482
2 Sheets-Sheet 2
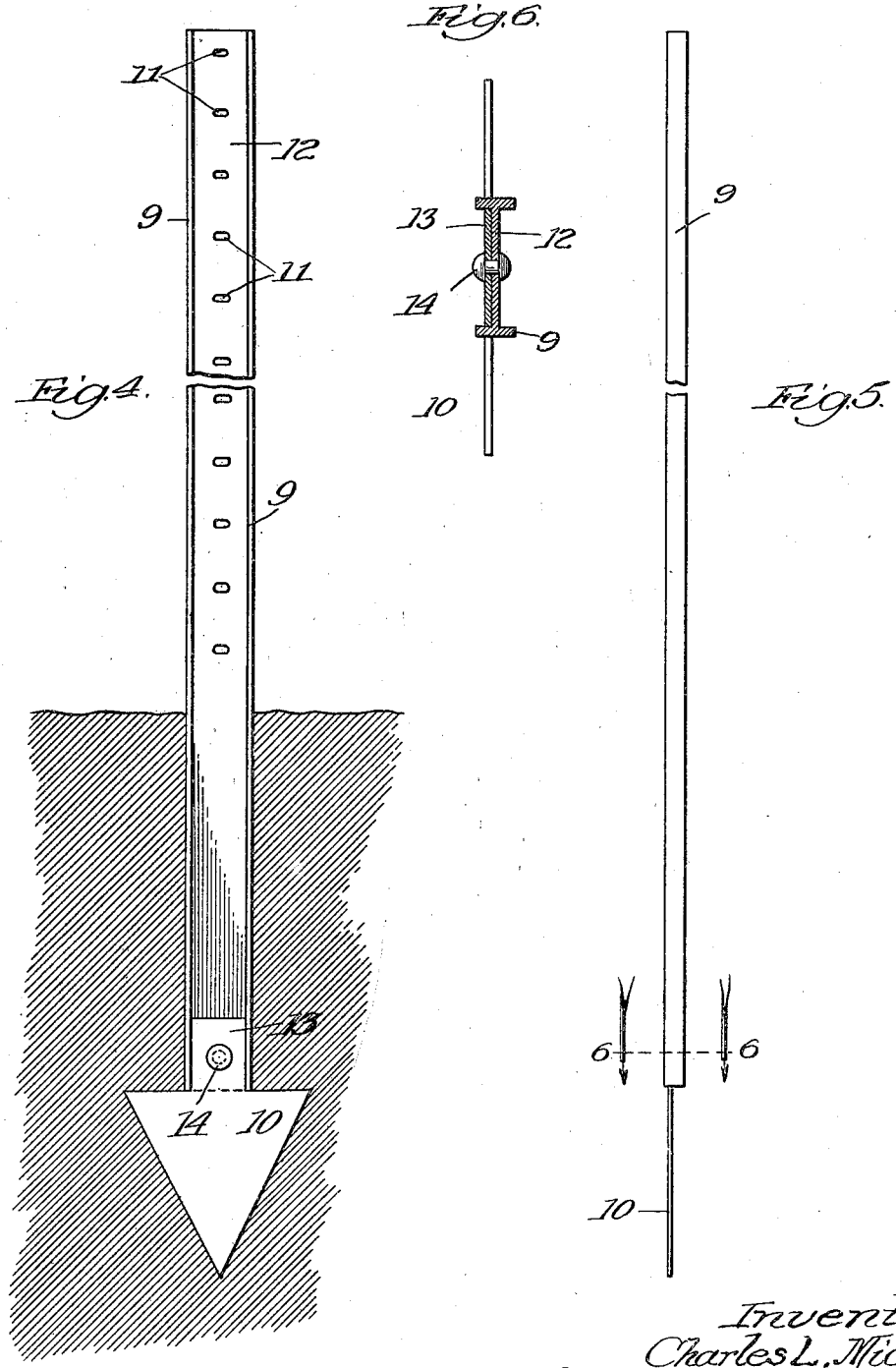
Inventor.
Charles L. Michod Patented June 3, 1924.

1,496,482

UNITED STATES PATENT OFFICE.

CHARLES L. MICHOD, OF CHICAGO, ILLINOIS.

FENCE STRUCTURE.

Application filed November 3, 1919. Serial No. 335,417.

*To all whom it may concern:*

Be it known that I, CHARLES L. MICHOD, a citizen of the United States, residing at Chicago, in the county of Cook and State of Illinois, have invented a new and useful Improvement in Fence Structures, of which the following is a specification.

My invention relates, more particularly, to fence structures involving relatively rigid end-posts, wires arranged in spaced relation extending from post to post and in taut condition, and line-supports or members which are located at intervals along the fence and to which the wires are secured.

My primary object is to provide improvements in fence systems of the type above referred to, to the end that they may be constructed relatively economically and function in a highly desirable manner.

Generally stated, my invention consists in forming the fences of relatively rigid end-posts, with wires engaging the end-posts and extending lengthwise of the fence structure and arranged in taut condition, together with a series of rigid line-supports which are located at intervals between the end-posts and extend at their lower ends into the ground and to which line-supports the said wires are connected in spaced relation to each other, the line-supports being so constructed, preferably with anchorages at their lower ends operating to hold the line-supports against vertical displacement in the ground, as to cause them and also the anchorages, when the latter are provided, to tilt as a unit in the ground, thus cutting through the ground in which they are imbedded, without buckling, when relatively great stresses are exerted against the line-supports, such as are exerted when an animal runs or lies against the fence, and be returnable to upright position under the tension of the wires when the force deflecting the fence is removed or spent.

Referring to the accompanying drawings:—Figure 1 is a perspective view of a portion of a fence system embodying my invention. Figure 2 is a broken view in side elevation of one of the line-supports, with the device for fastening the wire thereto shown in position on the support, but with the wire omitted. Figure 3 is a section taken at the line 3—3 on Fig. 2 and viewed in the direction of the arrows. Figure 4 is a view in side elevation of one of the similar line-supports, showing it as imbedded in the ground and with a portion of its upright section broken away. Figure 5 is an edge view of the line-support of Fig. 4; and Figure 6, an enlarged section taken at the line 6—6 on Fig. 5 and viewed in the direction of the arrows.

Referring to the structure shown in Fig. 1, 7—7 represents two relatively rigid end-posts, preferably braced as represented, and 8 represents wires which extend from one of the end-posts to the other thereof in taut condition and are spaced one from the other as represented. Extending at intervals along the wires thus provided, are line-supports which are provided primarily for holding the wires 8 in uniformly spaced relation, these supports preferably comprising uprights 9 provided at their lower ends with anchorage means 10 which latter, when these line-supports are in position in the ground, serve to prevent vertical displacement of the supports.

In the particular illustrated embodiment of my invention, the uprights 9 are formed of structural steel in the form of I-beams containing apertures 11 in the web portions 12 thereof, these apertures being disposed in vertical series as shown of the upright in Fig. 4 and serving as a means for preventing displacement on the uprights of the fastening devices hereinafter referred to. The anchorage means 10 are shown as formed of an arrow-shaped plate having an upwardly extending shank portion 13 which extends upwardly in the channel at one side of the I-beam 9 and fits against the web 12, in which position it is secured as through the medium of a rivet 14.

Where the upright is formed of an I-beam, it is preferred that it be of such cross-sectional shape, generally as illustrated in the drawing, to present a greater cross-sectional dimension in one direction, namely, crosswise of its flanges, than in the opposite direction, the upright thus provided presenting relatively great rigidity to forces tending to deform it when positioned in the ground to extend at its longer cross-sectional dimension crosswise of the wire as shown in the drawings. The idea is to provide the line-supports as rigid structures, of such form and proportions that while they are capable of performing the functions of a line-support, they will cut through the ground as a unit as distinguished from bending or flexing under stresses, as explained in the fore part of this specification, and will move back to normal, or substantially normal, position under the pull of the wires in tension when the force against the fence and which deflected the line-supports and wires connected therewith, is removed or spent. The size and shape of these line-supports are dependent upon various conditions presented. The following, however, will serve as an example of actual use. For a span from one rigid end-post to another, of 20 rods, with 10 line-supports located at equal distances apart and with the wires of about No. 9 gauge, the line-supports, where made of steel or iron, may be provided of the I-beam shape shown, the metal being about ⅛" thick and the line-supports of a weight of about one and one-half pounds for each foot length with their total depth about double their width, generally as illustrated. These line-supports 9 are so formed and proportioned as to withstand the maximum tension of the wires.

In building the fence, the end-posts 7 and line-supports 9 are caused to become imbedded in the ground, the line-supports being so positioned that their longer cross-sectional dimension extends in a direction crosswise of the wires 8, or in other words, these supports oppose the fence wires at their narrow faces, as shown, the particular construction of the line-support shown adapting it, if desired, to be driven into the ground. The wires 8, strung in taut condition from one end-post 7 to the other thereof, are connected with the line-supports in any desirable way, as for example, by binding wires represented at 15 which are passed around the rear face of the line-support, then at their ends, in opposite directions through one of the openings 11 wherein they cross and are connected at their free ends with the adjacent wire 8 as by twisting them about the latter, as indicated at 16, the fastening thus provided preventing the post from twisting under the action of forces tending to twist the post.

It will be understood from the foregoing that when relatively great forces are exerted against the fence tending to deflect it, as by animals running or leaning against same, each line-support connected with the wires thus deflected tilts as a unit in the ground in a direction crosswise of the fence, cutting through the ground and returning to normal, or substantially normal, upright position under the tension of the wires when the force which deflected the fence is removed or spent. The line-supports provided of the form shown and disposed relative to the fence wires, as stated, may be constructed of a comparatively small amount of metal and still present the desired degree of rigidity for performing as above explained, the supports being comparatively narrow and readily cutting through the ground. The anchorages 10, provided in accordance with the preferred embodiment of my invention, serve to prevent vertical movement of these line-supports in the ground and present relatively slight resistance to the cutting of same through the ground in a direction at substantially right angles to the line of the fence, under relatively great stress exerted laterally against the wires 8.

While I have illustrated and described a particular construction of fence embodying my invention, I do not wish to be understood as intending to limit it thereto as the the same may be variously modified and altered without departing from the spirit of my invention, it being my intention to claim my invention as fully and completely as the prior state of the art will permit.

What I claim as new and desire to secure by Letters Patent is:

1. A fence structure comprising relatively rigid end posts, wires engaging therewith under tension, a series of line supports, and means connecting said wires to said line supports and holding these parts against relative movement lengthwise of the fence, the lower ends of the line supports being embedded in the ground and being so formed as to ground-cut when relatively great force is exerted against the fence, and return to substantially upright position, solely by the action of the wires, upon the removal of such force.

2. A fence structure comprising relatively rigid end posts, wires engaging therewith under tension, a series of line supports, and means connecting said wires to said line supports and holding these parts against relative movement lengthwise of the fence, those faces of said line supports which oppose said wires being of less width than the sides thereof which extend angularly relative to the wires, the lower ends of the line supports being embedded in the ground and being so formed as to ground-cut when relatively great force is exerted against the fence, and return to substantially upright position, solely by the action of the wires, upon the removal of such force.

CHARLES L. MICHOD.